(12) United States Patent
Jalobeanu

(10) Patent No.: US 7,536,607 B2
(45) Date of Patent: May 19, 2009

(54) TASK SEQUENCE INTEGRATION AND EXECUTION MECHANISM WITH AUTOMATED GLOBAL CONDITION CHECKING AND COMPENSATION

(75) Inventor: Mihai R. Jalobeanu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 817 days.

(21) Appl. No.: 11/065,909

(22) Filed: Feb. 25, 2005

(65) Prior Publication Data

US 2006/0195678 A1 Aug. 31, 2006

(51) Int. Cl.
*G06F 11/00* (2006.01)
(52) U.S. Cl. .............................. 714/47; 714/38; 714/48; 718/100
(58) Field of Classification Search .................... 714/38, 714/39, 47, 48, 49, 51; 712/35; 718/100, 718/102
See application file for complete search history.

(56) References Cited

U.S. PATENT DOCUMENTS

| 2003/0041288 A1* | 2/2003 | Kolawa et al. ................. 714/38 |
| 2005/0081192 A1* | 4/2005 | DeLine et al. .............. 717/126 |
| 2008/0066030 A1* | 3/2008 | Hekmatpour et al. .......... 716/5 |

* cited by examiner

*Primary Examiner*—Robert Beausoliel
*Assistant Examiner*—Joseph D Manoskey
(74) *Attorney, Agent, or Firm*—Workman Nydegger

(57) ABSTRACT

A method for verifying that a sequence of tasks is more likely to be successful prior to executing the sequence of tasks. First, a projection algorithm is performed to generate a precondition and postconditions list for the entire sequence. In order to execute the sequence of tasks, it is determined whether or not all of the preconditions in the preconditions list are satisfied. If they are not, then the sequence of task fails without performing any of the sequence of tasks. On the other hand, if the sequence preconditions are all satisfied, the sequence of tasks is executed one at a time. If any of the sequence of tasks fails, then the tasks that have been executed may be compensated to return to the initial state. Once execution completes assuming none of the task executions failed, the postconditions for the sequence are checked.

24 Claims, 6 Drawing Sheets

TASK SEQUENCE INTEGRATION AND EXECUTION MECHANISM WITH AUTOMATED GLOBAL CONDITION CHECKING AND COMPENSATION

BACKGROUND OF THE INVENTION

1. The Field of the Invention

The present invention relates to computing technology; and more specifically, to mechanisms for integrating and executing a sequence of tasks with automated global condition checking to avoid unnecessarily attempting to execute the sequence if the sequence cannot be completed, and with automated compensation if the sequence is attempted but cannot be completed.

2. Background and Related Art

Computing technology has transformed the way we work and play. Computing systems now take a wide variety of forms including desktop computers, laptop computers, tablet PCs, Personal Digital Assistants (PDAs), household devices and the like. In its most basic form, a computing system includes system memory and one or more processors. Software in the system memory may be executed by the processor to direct the other hardware of the computing system to perform desired functions.

Many software applications must have reliable access to accurate data in order to function properly. Applications that use data stored in a non-transactional data store can suffer from inherent reliability problems because incomplete changes made to the data in the data store may result in loss in data, or relational integrity of the data. Such incomplete changes may have been made when a sequence of actions ends unexpectedly prior to completion. In a transactional data store, the sequence of actions may simply be rolled back to its initial state as though the sequence of actions never began, thereby ensuring data integrity. A non-transactional data store does not provide this option.

A common solution to this problem is a Compensating Resource Manager (CRM), which controls and monitors the sequence of components that perform the actions. The action execution is usually done in two phases. In the first phase, the CRM instructs all participating components to acquire their resources. In the second phase, the CRM instructs the components to commit the changes. If the components were to fail, the CRM issues a sequence of compensating actions to undo the incomplete changes.

The CRM is able to recover the initial data as it existed prior to the sequence of actions. However, the CRM may waste processing resources since it does not detect whether or not the sequence of actions has a logical flaw that would necessarily cause the sequence of actions to fail. Instead, the CRM causes the sequence of actions to commence, regardless of the futility of doing so, until the execution actually fails due to the logical flaw. For example, a sequence that consists of Delete(x), followed by Copy(x) will necessarily fail, because the parameter "x" will not exist at the time the method Copy (x) is initiated. Therefore, Copy(x) (and the action sequence) must necessarily fail.

Accordingly, what would be advantageous are mechanisms that permit logical flaws in a task or a sequence of tasks to be detected without actually exercising futility in commencing the sequence of tasks. It would further be desirable if such a mechanism provided a way to roll back any changes should the sequence of tasks regarding of such global precondition checking.

BRIEF SUMMARY OF THE INVENTION

The foregoing problems with the prior state of the art are overcome by the principles of the present invention, which are directed towards a method for verifying that a sequence of tasks is more likely not to fail prior to executing the sequence of tasks by verifying that preconditions for the tasks are not mutually conflicting and are satisfied, and for compensating for the sequence of tasks should any non-conflicting postconditions not be met.

First, a projection algorithm is performed. For instance, the precondition(s) for the first task in the sequence are accessed and added to a sequence preconditions list. The postcondition (s) for the first task are accessed and added to a sequence postconditions list. Then, for each subsequent task in the sequence of tasks, the following is performed one task at a time.

The precondition(s) for the subsequent task are accessed. Then, it is determined whether or not any of the precondition (s) for the subsequent task conflicts with any conditions in the sequence preconditions list and the sequence postconditions list. If any of the preconditions for the subsequent task conflict with any of the conditions of the sequence preconditions list or the sequence postconditions list, the sequence of tasks fails. On the other hand, if the precondition(s) for the subsequent task do not conflict with any of the conditions of the sequence preconditions list or the sequence postconditions list, the precondition(s) are added to the sequence preconditions list if they are not already represented in the sequence preconditions list and if they are not already represented in the sequence postconditions list. The postcondition(s) for the subsequent task are also accessed and added to the sequence postconditions list. If any of the postcondition(s) of the subsequent task conflict with any of the postconditions in the sequence postconditions list, the conflicting postconditions in the sequence postconditions list are removed from the sequence postconditions list.

In order to execute the sequence of tasks, it is determined whether or not all of the preconditions in the sequence preconditions list are satisfied. If they are not all satisfied, then the sequence of tasks fails once again without performing any of the sequence of tasks. On the other hand, if the sequence preconditions are all satisfied, the sequence of tasks is executed one at a time. If any of the sequence of tasks fails, then the tasks that have been executed may be compensated to return to the initial state. Once execution completes assuming none of the task executions failed, the postconditions for the sequence are checked. If any of the postconditions are not satisfied, the sequence of tasks fails and is then compensated for. If the postconditions are all satisfied, then the sequence of tasks has successfully concluded.

Accordingly, it is more likely that if execution of the sequence of tasks is initiated that the execution will be successful. In one embodiment, the task is performed on a non-transactional data store. Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
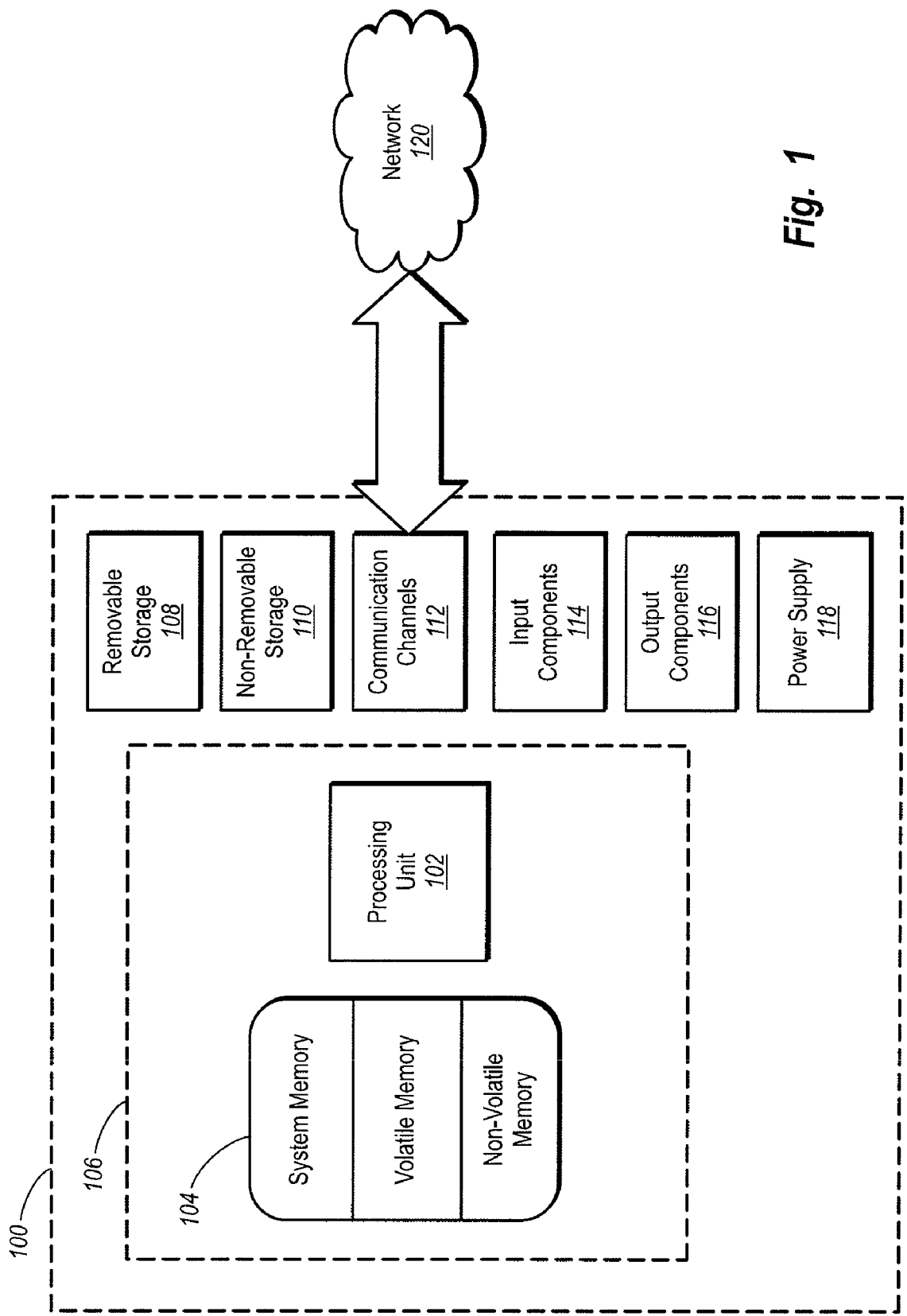
FIG. 1 illustrates a suitable computing system that may implement features of the present invention.

The principles of the present invention relate to a method of executing a sequence of tasks in a manner that verifies that performance of the task sequence will not likely result in failure. First, a projection algorithm is performed to generate a precondition and postconditions list for the entire sequence. In order to execute the sequence of tasks, it is determined whether or not all of the preconditions in the sequence preconditions list are satisfied. If they are not all satisfied, then the sequence of task fails without performing any of the sequence of tasks. On the other hand, if the sequence preconditions are all satisfied, the sequence of tasks is executed one at a time. If any of the sequence of tasks fails, then the tasks that have been executed may be compensated to return to the initial state. Once execution completes assuming none of the task executions failed, the postconditions for the sequence are checked. If any of the postconditions are not satisfied, the sequence of tasks fails and is then compensated. If the postconditions are all satisfied, then the sequence of tasks has successfully concluded.

Prior to describing the details of the principles of the present invention, a suitable computing architecture that may be used to implement the principles of the present invention will be described with respect to FIG. 1. In the description that follows, embodiments of the invention are described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the principles of the invention are being described in the foregoing context, it is not meant to be limiting as those of skill in the art will appreciate that several of the acts and operations described hereinafter may also be implemented in hardware.

Turning to the drawings, wherein like reference numerals refer to like elements, the principles of the present invention are illustrated as being implemented in a suitable computing environment. The following description is based on illustrated embodiments of the invention and should not be taken as limiting the invention with regard to alternative embodiments that are not explicitly described herein.

FIG. 1 shows a schematic diagram of an example computer architecture usable for these devices. For descriptive purposes, the architecture portrayed is only one example of a suitable environment and is not intended to suggest any limitation as to the scope of use or functionality of the invention. Neither should the computing systems be interpreted as having any dependency or requirement relating to any one or combination of components illustrated in FIG. 1.

The principles of the present invention are operational with numerous other general-purpose or special-purpose computing or communications environments or configurations. Examples of well known computing systems, environments, and configurations suitable for use with the invention include, but are not limited to, mobile telephones, pocket computers, personal computers, servers, multiprocessor systems, microprocessor-based systems, minicomputers, mainframe computers, and distributed computing environments that include any of the above systems or devices.

In its most basic configuration, a computing system 100 typically includes at least one processing unit 102 and memory 104. The memory 104 may be volatile (such as RAM), non-volatile (such as ROM, flash memory, etc.), or some combination of the two. This most basic configuration is illustrated in FIG. 1 by the dashed line 106. In this description and in the claims, a "computing system" is defined as any hardware component or combination of hardware components capable of executing software, firmware or microcode to perform a function. The computing system may even be distributed to accomplish a distributed function.

The storage media devices may have additional features and functionality. For example, they may include additional storage (removable and non-removable) including, but not limited to, PCMCIA cards, magnetic and optical disks, and magnetic tape. Such additional storage is illustrated in FIG. 1 by removable storage 108 and non-removable storage 110. Computer-storage media include volatile and non-volatile, removable and non-removable media implemented in any method or technology for storage of information such as computer-readable instructions, data structures, program modules, or other data. Memory 104, removable storage 108, and non-removable storage 110 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computing system.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in software and hardware or hardware are also possible and contemplated. In this description, a "computing entity" may be any computing system as previously defined herein, or any module or combination of modulates running on a computing system.

Computing system 100 may also contain communication channels 112 that allow the host to communicate with other systems and devices over, for example, network 120. Communication channels 112 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

The computing system 100 may also have input components 114 such as a keyboard, mouse, pen, a voice-input component, a touch-input device, and so forth. Output components 116 include screen displays, speakers, printer, etc., and rendering modules (often called "adapters") for driving them. The computing system 100 has a power supply 118. All these components are well known in the art and need not be discussed at length here.

Figure 2:
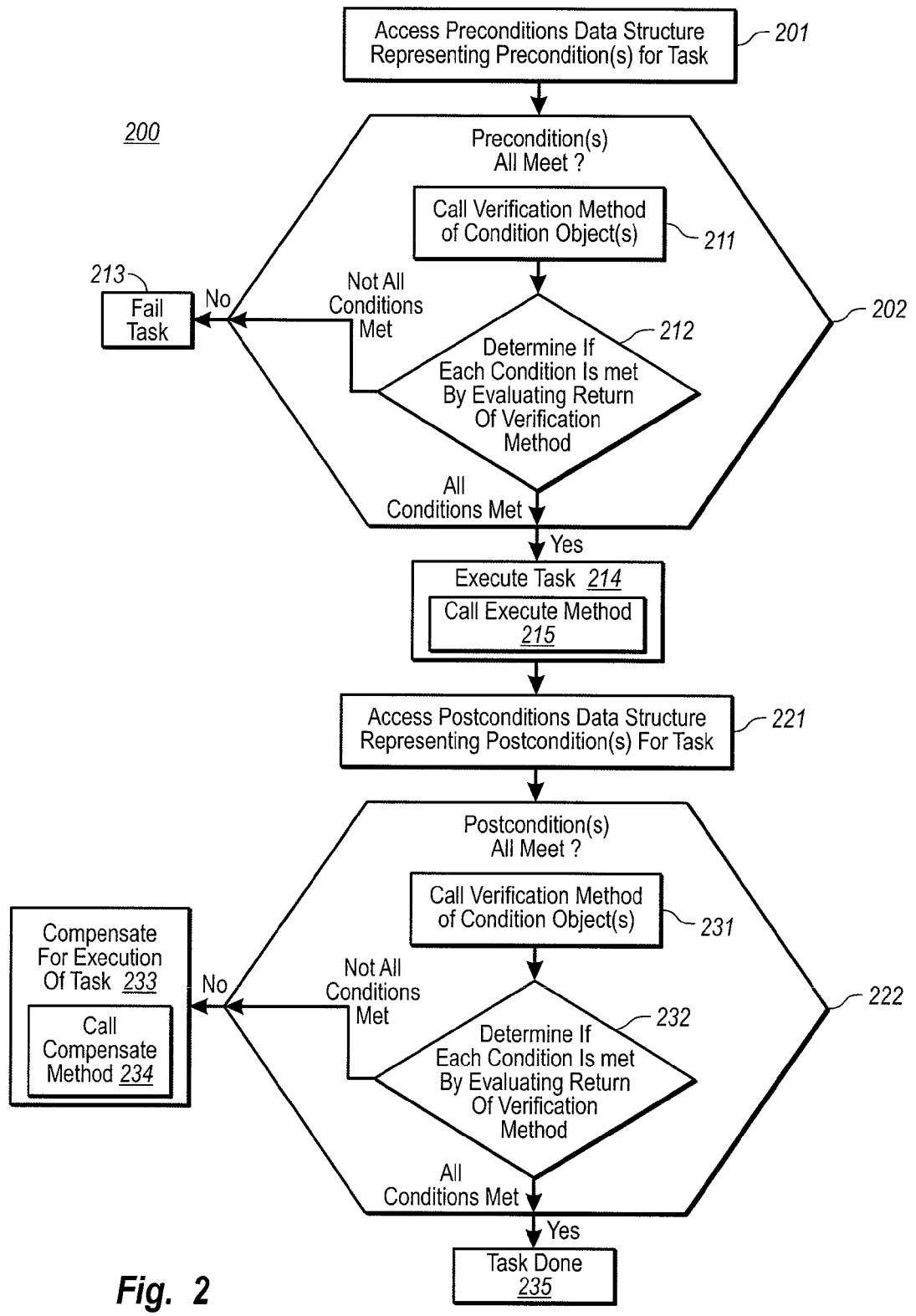
FIG. 2 schematically illustrates a flowchart of a computerized method for executing a single task only if preconditions for the task are met, and for compensating for the task if postconditions for the task are not met.

FIG. 2 illustrates a flowchart of a method 200 for a computing system to execute a task. The computing system may be similar to the computing system 100 described above with respect to FIG. 1, although that need not be the case. The task may be performed by any suitably configured computing system that is capable of executing computer-executable instructions using one or more processors. The computing system may even be distributed amongst multiple computing systems.

The method 200 reduces the chance that the task will be executed in an invalid state by confirming that the task is internally consistent and that the data on which it is supposed to operate is valid. The task includes one or more preconditions that must be true prior to the execution of the task in order for the task to be internally consistent. The task also may also include one or more postconditions that should be true after the task is executed in order to the task to be internally consistent and the affected data to be considered valid. An example of a precondition or a postcondition may be represented with human-readable text as "a user with the specified email address exists in the system".

Figure 3:
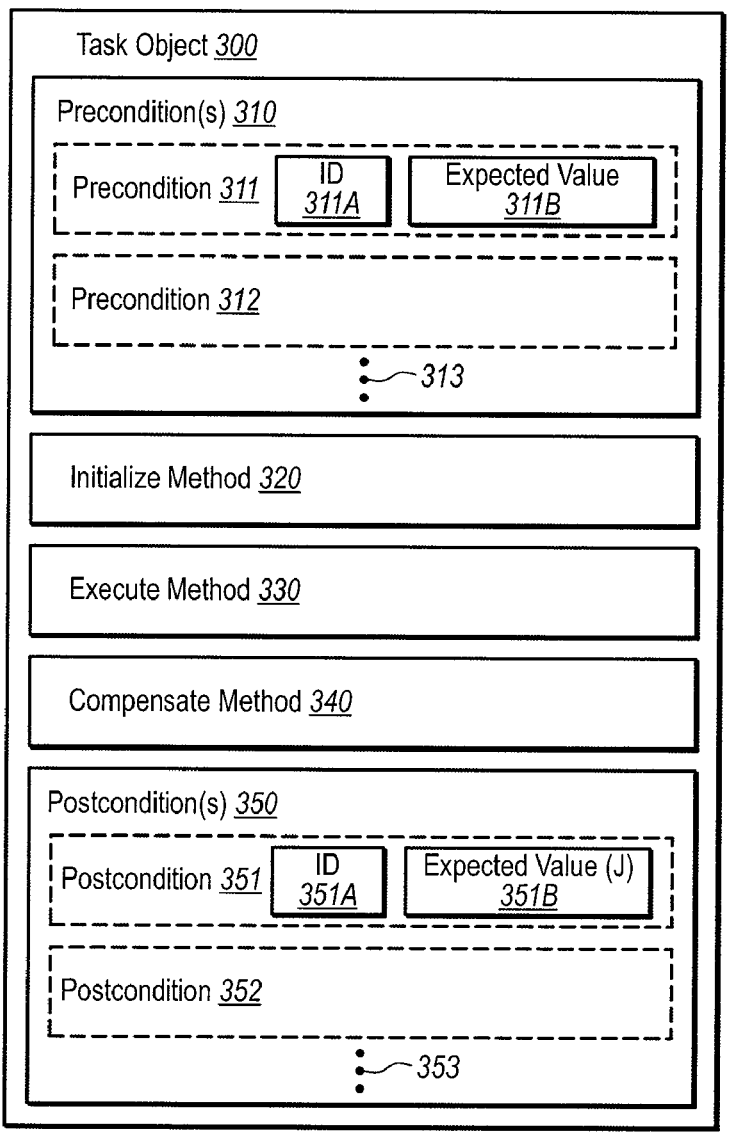
FIG. 3 schematically illustrates a task object including a preconditions data structure, a postconditions data structure, an initialize method, an execute method, and a compensate method.

Referring to FIG. 2, the computing system accesses a preconditions data structure that represents one or more preconditions for the task (act 201). In one embodiment, the preconditions data structure is present within a task object corresponding to the task to be performed. For instance, FIG. 3 schematically illustrates a task object 300 that includes a preconditions data structure 310. In the case of FIG. 3, the preconditions data structure 310 is shown as including two preconditions 311 and 312, among potentially others as represented by the vertical ellipses 313. However, the preconditions data structure of act 201 may include any number of preconditions.

As represented in precondition 311, although not required, the precondition may include an identifier field 311A identifying the parameter or general condition corresponding to a condition object that will be explained further below. The precondition 311 is illustrated as including the expected value (s) field 311B that expresses expected values for one or more parameters associated with the condition. The expected value may be a single value, multiple values, a range of values, multiple ranges of values, or combinations thereof.

Figure 4:
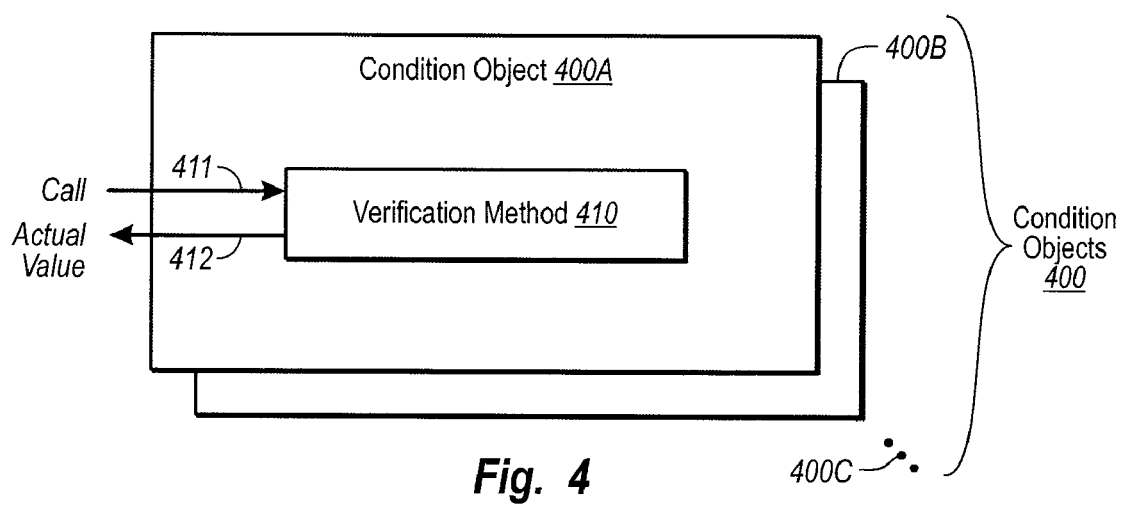
FIG. 4 schematically illustrates a condition object that verifies a condition using a verification method by providing an actual value associated with a parameter.

Returning to FIG. 2, after accessing the preconditions data structure (act 201), the computing system determines whether or not all of the one or more preconditions for the task are satisfied (decision block 202). This may be accomplished using condition objects such as those illustrated with respect to FIG. 4. As represented in FIG. 4, each condition object may include a verification method that may be called to return an actual value corresponding to one or more particular parameters. For example, FIG. 4 shows that there may be a variety of condition objects 400 for a variety of conditions including, for example, condition object 400A, condition object 400B, amongst potentially many others as represented by the ellipses 400C. The condition object 400A includes a verification method 410 that may be called (act 211) as represented by arrow 411 to determine the actual value associated with a parameter. The actual value 412 for the parameter is returned to the caller in response to the call. The computing system may verify whether a condition is true by evaluating the return of the call. For example, after calling 411 the verification method 410 of the condition object 400, the verification method returns 412 an actual value associated with zero or more parameters. The computing system may then determine whether or not the condition is met by determining whether or not the actual value conforms with the expected value(s) for the parameter(s). This process may be repeated for each precondition.

Returning to FIG. 2, if the precondition(s) are not determined to all be satisfied (NO in decision block 212), the task fails (act 213). For example, perhaps the actual value returned by a condition object corresponding to one of the preconditions does not correspond with an expected value for that precondition. This failing of the task occurs without the associated task being executed (see act 214). This failing is appropriate since the preconditions are not met, and thus there is some logical inconsistency in the task. Therefore, processing, memory, and other resources are not wasted by executing a task that will ultimately fail.

On the other hand, if the precondition(s) are determined to all be satisfied (YES in decision block 212), the task is executed (act 214). For example, perhaps the actual values returned by condition objects corresponding to all of the preconditions all correspond with the respective expected values for those preconditions. The execution of the task may be accomplished by, for example, calling an execution method of a task object corresponding to the task (act 215). For example, task object 300 is illustrated as including execution method 330. The execution method 330 may include some or all of the computer-executable instructions needed to accomplish the task, although the execution method 330 may call into other objects in order to accomplish all parts of the task. The task object 300 may also include an initialization method 320 to initialize the task object to a particular state needed or desired prior to execution of the task, although the initialization may instead be part of the execution method.

The execution of the task is much more likely to be successful using this method assuming that the preconditions for successful execution of the task are accurately represented. However, there is still no guaranty that the execution of the task will result in an accurate or desirable state. Accordingly, the method 200 may optionally include various (acts for verifying that postconditions for the task are met, and taking appropriate compensatory action if any of the postconditions are not met.

For instance, the computing system may access a postconditions data structure that represents one or more postconditions for the task (act 221). The postconditions data structure may also be within the associated task object for the task. For instance, task object 300 includes postconditions data structure 350. The postconditions data structure may be similar to the preconditions data structure. For instance, postconditions data structure 350 is illustrated as including two postconditions 351 and 352 amongst others as represented by the vertical ellipses 353. The postcondition 351 is shown as including an identifier field 351A that may identify (directly or indirectly) the condition, as well as an expected value field 351B. The act of accessing the postconditions (act 221) is illustrated as being directly after the execution of the task (act 214). However, the postconditions may be accessed at any point before determining whether or not all of the post condition(s) are satisfied (act 222).

After the execution of the task, the computing system determines whether or not all of the one or more postconditions are satisfied (act 222). This may be accomplished by, for example, calling a verification method of a condition object corresponding to each of the postcondition(s) for the task (act 231), and determining whether the postcondition is met by evaluating a return of the call of the verification method of the postcondition object (decision block 232). Once again, an actual value returned by the condition object may be compared with an expected value represented in the postconditions data structure.

If the one or more postconditions are not determined to all be satisfied (NO in decision block 232), the computing system compensates for the task execution (act 233) by, for example, calling a compensate method of the task object (act 234). For example task object 300 is illustrated as including a compensate method 340. A condition object may be used for both preconditions and postconditions. Accordingly, a condition object may, but need not, correspond to both a precondition for a task and a postcondition for the task.

The following is a source code example of a condition object corresponding to condition object 400 of FIG. 4 with line numbering added for clarity.

```
1.    public class UserExistsCondition : Condition
2.    {public string EmailAddress;
3.    public bool Verify( ) { }}
```

Line 1 is a declaration defining a class of the type "Condition" called "UserExistsCondition". The class verifies that a user corresponding to an e-mail address exists in a database. Line 2 represents the condition argument of "EmailAddress", which is a string representing the e-mail address of the user that is to be verified as existing in the database. Line 3 is a declaration of the Verify method, which may be called with the "EmailAddress" as the input parameter. The condition would then return a Boolean representing whether or not the user is present.

The following is an example of a task object that follows the general structure of the task object 300 of FIG. 3 with line numbers added for clarity.

```
1.    public class DeleteUser : Task
2.    {public string EmailAddress { get; set;}
3.    public void Initialize( ) {...}
4.    public void Execute( ) {...}
5.    public void Undo( ) {...}
6.    [Precondition(ExpectedResult=true)]
7.    [Postcondition(ExpectedResult=false)]
8.    private UserExistsCondition UserExists { get { return
      new UserExistsCondition(EmailAddress); } }}
```

The task deletes a user with a specified e-mail address. Line 1 declares the class of type "Task" and titled "DeleteUser". Line 2 defines the parameters of the task, which is the "EmailAddress" parameter that has associated "get" and "set" methods. Line 3 declares the initialization method. Line 4 declares the execution method. Line 5 declares the compensation method (called "Undo"). Line 6 is the preconditions data structure that identifies the expected result for a particular precondition. Line 7 is a postconditions data structure that identifies the expected result for a particular postcondition. Line 8 identifies the particular condition, which represents both the precondition and the postcondition.

Figure 5:
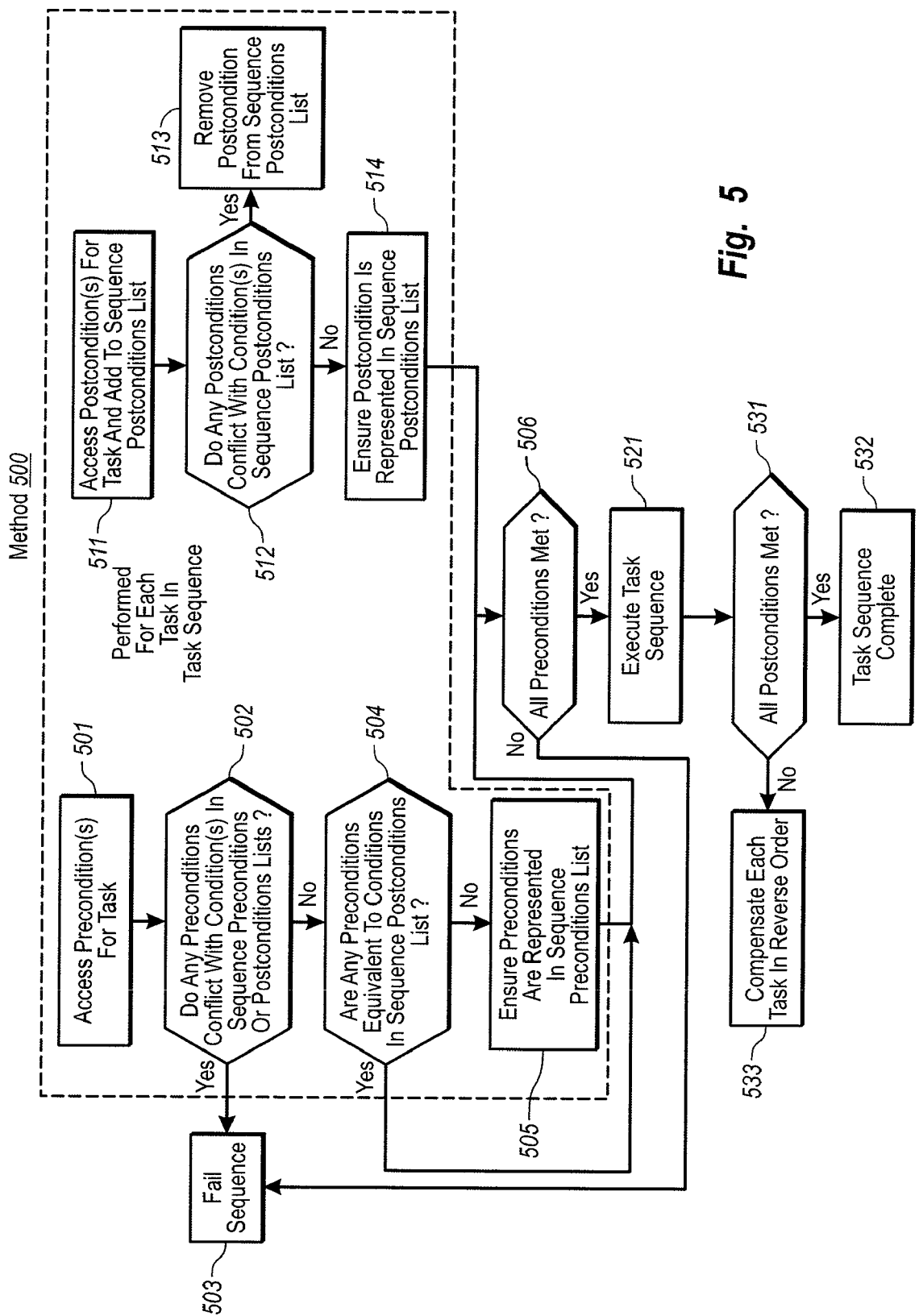
FIG. 5 illustrates a method for reliably performing a sequence of tasks by first determining if all of the preconditions associated with a sequence of tasks are all internally consistent and satisfied, and compensating for the sequence of tasks if not all of the non-conflicting postconditions are met in accordance with the principles of the present invention.

This programming model may be built upon to perform precondition and postcondition checking not just for a single task, but for an entire sequence of tasks. FIG. 5 illustrates a flowchart of a method 500 for verifying that a sequence of tasks is more likely not to fail prior to executing the sequence of tasks by performing a global precondition check. If appropriate, the sequence of tasks is executed, and then a global postcondition check is performed. If the execution of the sequence of tasks fails, or the global postcondition check fails, the sequence of tasks is undone through compensation action in reverse order through each task.

Figure 6A:
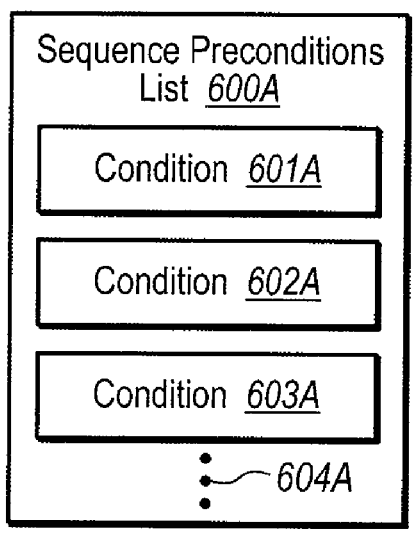
FIG. 6A schematically illustrates a sequence preconditions list in accordance with the principles of the present invention.
Figure 6B:
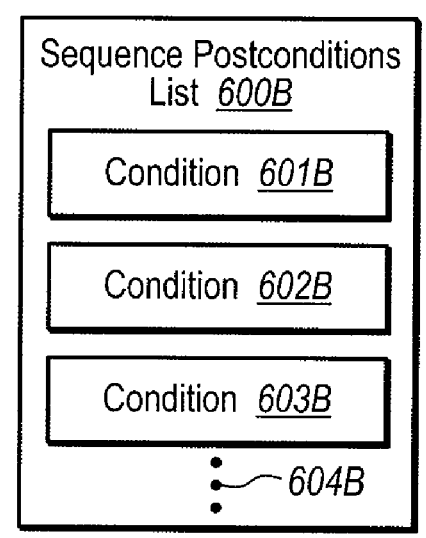
FIG. 6B schematically illustrates a sequence postconditions list in accordance with the principles of the present invention.

The method uses a sequence preconditions list and a sequence postconditions list to accumulate sequence preconditions and sequence postconditions that will be populated through a projection method represented by acts 501 through 504 and acts 511 through 514 of FIG. 5 explained below. An example of the sequence preconditions list is represented in FIG. 6A by sequence preconditions list 600A, which is illustrated as including conditions 601A, 602A, 603A, amongst potentially others as represented by the vertical ellipses 604A. Initially, the sequence preconditions list may be empty at the beginning of the projection method. Likewise, an example of the sequence postconditions list is represented in FIG. 6B by sequence preconditions list 600B, which is illustrated as including conditions 601B, 602B, 603B, amongst potentially others as represented by the vertical ellipses 604B. The sequence postconditions list may be empty at the beginning of the projection method. The projection method is performed for each task in the task sequence beginning with the first.

Specifically, for each task, the computing system accesses one or more preconditions for the task in the sequence of tasks (act 501). These preconditions may be represented in the associated task object for the task as previously described with respect to FIGS. 2 and 3.

For the current task, the computing system then determines whether or not any of the one or more preconditions for the current task conflict with any conditions in the sequence preconditions list and the sequence postconditions list (decision block 502). The determination can be made by, for example, comparing the identifier, parameter(s) and expected result of the preconditions with the identifier, parameter(s) and expected result of each of the conditions in the sequence preconditions list and the sequence postconditions list. If the identifiers and parameters are respectively equal, but the expected results are not, the two conditions are conflicting. For the first task in the sequence, since the sequence preconditions list and the sequence postconditions list are empty, this decision need not be made as there is not conflict.

For the current task, the computing system then determines whether or not any of the one or more preconditions for the current task are equivalent to conditions in the sequence postconditions list (decision block 504). The determination can be made by, for example, comparing the identifier, parameter(s) and expected result of the precondition with the corresponding identifier, parameter(s) and expected result of each of the conditions in the sequence postconditions list. If the identifiers, parameters and expected results are respectively equal, the two conditions are equivalent. For the first task in the sequence, since the sequence preconditions list and the sequence postconditions list are empty, this decision need not be made as there is not conflict.

If the one or more preconditions for the current task do not conflict with any of the conditions (NO in decision block 502), and are not equivalent to any of the postconditions (NO in decision block 504), the computing system ensures that the one or more preconditions are represented in the sequence preconditions list (act 505). For the first task, this would likely mean just adding the one or more preconditions to the sequence preconditions list. For subsequent tasks, this could means adding the precondition if the precondition is not already represented from a prior task.

The computing system also accesses one or more postconditions for the task and adds the postconditions to the sequence postconditions list if the postcondition is not already represented in the list (act 511). For each postcondition, the computing system then determines if the postcondition conflicts with any of the postconditions already in the sequence postconditions list (decision block 512). If the postcondition conflicts with any of the postconditions in the sequence postconditions list (YES in decision block 512), the computing system ensures that the conflicting postcondition in the sequence postconditions list is removed from the sequence postconditions list (act 513).

If the postcondition does not conflict with any of the postconditions in the sequence postconditions list (NO in decision block 512), the computing system ensures that the postcondition is represented in the sequence postconditions list (act 514). This would mean adding the postcondition to the sequence postconditions list if not already represented. Once the projection method is applied to one task in the sequence of tasks, the projection method is applied to the next task, and so forth, until the projection method is applied to the entire sequence of tasks. At the end of the application of the projection method to all tasks in the sequence, the sequence preconditions list and the sequence postconditions list will represent global preconditions and postconditions, respectively, for the sequence of tasks as a whole.

Prior to execution of the sequence of tasks, the computing system determines whether or not all of the preconditions in the sequence preconditions list are satisfied (decision block 506). This could be done by calling the verification method of each condition object for all preconditions, and comparing the actual value returned by the verification method with an expected value as described above with respect to FIGS. 2, 3 and 4.

If not all of the preconditions in the sequence preconditions list are satisfied (NO in decision block 506), the computing system fails the sequence of tasks without performing any of the sequence of tasks (act 503). Accordingly, system resources are not wasted by attempting execution of a sequence of tasks if the sequence is not logically consistent and does not have a chance for succeeding.

On the other hand, if all of the preconditions in the sequence preconditions list are satisfied (YES in decision block 506), then the sequence of tasks is executed (act 521) beginning with the first task, and followed by the one or more subsequent tasks in the sequence of tasks. This may be accomplished for each task by calling an execution method of each task object in the proper order for the sequence.

If, at any point, execution of the sequence of tasks fails, despite the global precondition checking, the compensation method for the tasks may be called in reverse order to thereby undo the sequence. If the execution of the sequence of tasks completes, the computing system then performs a global postcondition check.

Specifically, the computing system determines whether or not all of the postconditions in the sequence postconditions list are satisfied (decision block 531). This may also be accomplished using the verification method associated with each condition object associated with the postconditions as described above with respect to FIGS. 2, 3 and 4. If all of the postconditions in the sequence postconditions list are satisfied (YES in decision block 531), the execution of the sequence of tasks is successfully completed (act 532). On the other hand, if not all of the postconditions in the sequence postconditions list are satisfied (NO in decision block 531), then the computing system compensates for the sequence of tasks by undoing each task in reverse order (act 533). This may be performed by calling the compensation method of each task object in reverse order.

Figure 7:
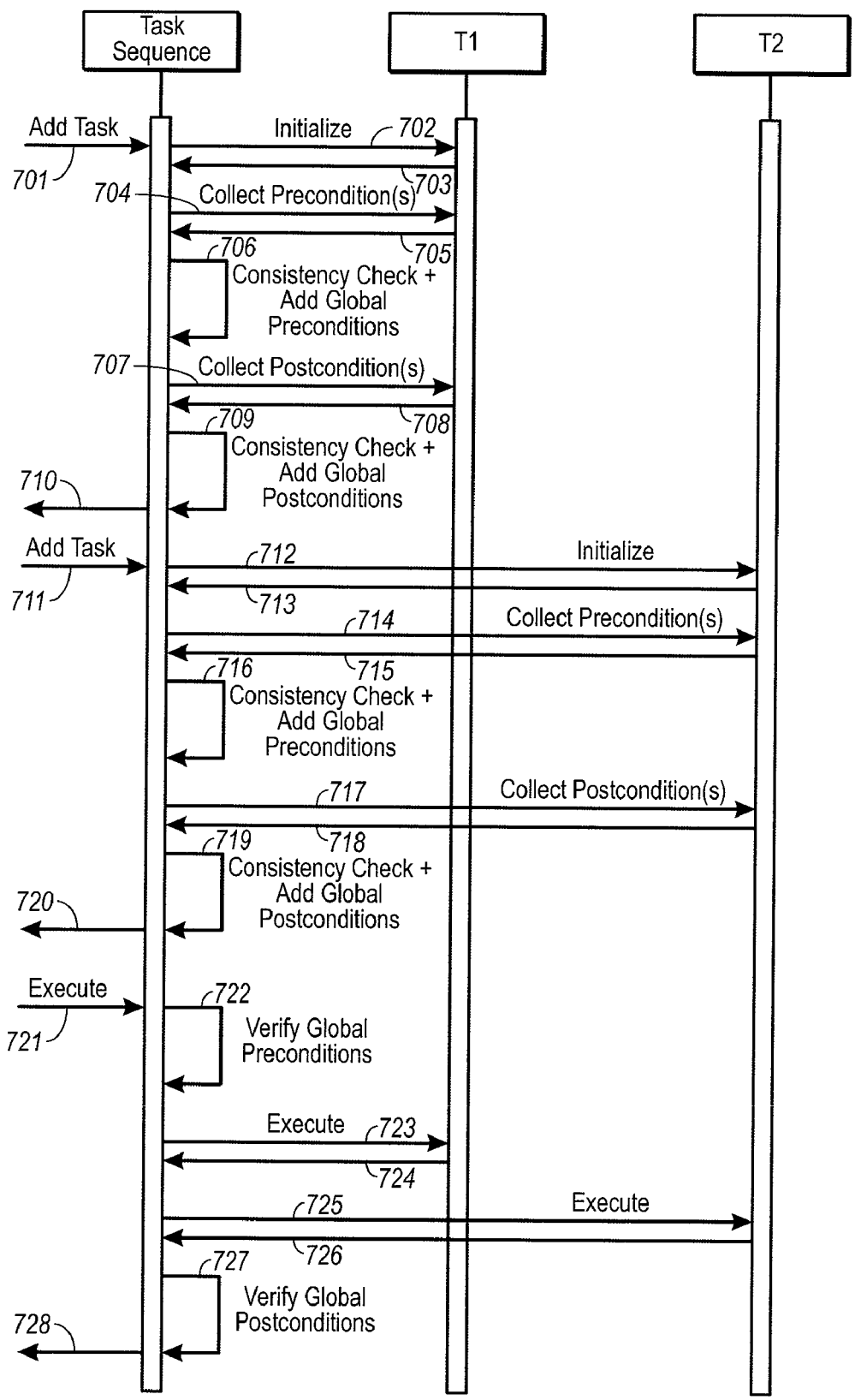
FIG. 7 illustrates message flow involved with reliably performing a task sequence in accordance with the principles of the present invention.

FIG. 7 illustrates an example logical flow associated with a task sequence that first includes a first task represented by task object T1 followed by a second task represented by task object T2. The task sequence may also be represented as a task object. The task sequence object may include an additional method called "add task".

In response to a call to add a first task (see arrow 701) represented by task object T1, the task sequence object calls the initialization method of the task object T1 (see arrow 702), to place the task object in the appropriate initial state. The initialization method returns (see arrow 703) after initializing. The task sequence object then accesses the preconditions for the task object T1 (see arrows 704 and 705), performs a consistency check of the preconditions and adds the preconditions to the sequence preconditions list if appropriate (see arrow 706). The task sequence object then accesses the postconditions for the task object T1 (see arrows 707 and 708), performs a consistency check of the postconditions and adds the postconditions to the sequence postconditions list if appropriate (see arrow 709). This completes application of the projection method to the first task. The task sequence object may then return the call (see arrow 710) to indicate successful adding of the first task to the task sequence.

The task sequence object also receives a call to add a second task (see arrow 711) represented by task object T2, the task sequence object calls the initialization method of the task object T2 (see arrow 712), to place the task object in the appropriate initial state. The initialization method returns (see arrow 713) after initializing. The task sequence object then accesses the preconditions for the task object T2 (see arrows 714 and 715), performs a consistency check of the preconditions and adds the preconditions to the sequence preconditions list if appropriate (see arrow 716). The task sequence object then accesses the postconditions for the task object T2 (see arrows 717 and 718), performs a consistency check of the postconditions and adds the postconditions to the sequence postconditions list if appropriate (see arrow 719). This completes application of the projection method to the second task.

The projection method may be applied to multiple further tasks. The net result is that the task sequence object populates a sequence preconditions list (which is a preconditions data structure for the task sequence object), and populates a sequence postconditions list (which is a postconditions data structure for the task sequence object). This projection method may be applied well before any execution of the sequence of tasks, although that need not be the case.

In response to a call to execute the task sequence (see arrow 721) (e.g., by calling an execute method of the task sequence object, the task sequence object verifies the global preconditions in the sequence preconditions list (see arrow 722), and calls the execute method of each task object in the proper order for the sequence. For instance, the task sequence object calls the execute method of the task object T1 (see arrow 723), which then returns (see arrow 724). If the task object T1 return 724 indicates failure of the execution, then the task sequence object may immediately return 728 a failure of the execution of the task sequence. On the other hand, if the task object T1 return 724 indicates success of the task execution, the task sequence object calls the execute method of the task object T2 (see arrow 725), which then returns (see arrow 726). If the task object T2 return 726 indicates failure of the execution, then the task sequence object may immediately return 728 a failure of the execution of the task sequence. On the other hand, if the task object T2 return 726 indicates success of the task execution, the task sequence object may call the execute method of the next task object (if any), or otherwise if task object T2 is the last task object to be executed, the task sequence object may verify that the global postconditions represented in the sequence postconditions list are satisfied (see arrow 727). If all of the postconditions are satisfied, the task sequence object returns 728 success of the task sequence.

The task sequence object may be structured similar to the task object, with a preconditions data structure, a postconditions data structure, an initialization method, an execution method, and a compensation method. The preconditions data structure is simply the sequence preconditions list. The postconditions data structure is simply the sequence postconditions list. The execution method will simply call the execution methods of each of the component task objects in order, returning failure if any of the executions results in failure, and returning success if all of the executions result in success. The compensation method will simply call the compensation methods of each of the component task objects in reverse order. Since the task sequence object may be structured similar to the task object, the task sequence object may itself become a component task object for yet another task sequence object. Accordingly, the principles of the present invention enable convenient construction and efficient execution of even complex task sequences.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In a computing system that includes one or more processors and a computer-readable media having thereon computer-executable instructions, a method for the computing system to generate, prior to execution of a sequence of tasks, a sequence preconditions list and a sequence postconditions list for the entire sequence by combining and consolidating one or more preconditions and one or more postconditions from individual tasks in the sequence of tasks, and, also prior to execution of any task in the sequence of tasks, using the preconditions and postconditions to check for conflicts and thereby verify that the sequence of tasks is more likely not to fail, the method performed by executing the computer-executable instructions by the one or more processors, the method comprising the following:

an act of accessing one or more preconditions for a first task in the sequence of tasks;

an act of adding the one or more preconditions to the sequence preconditions list;

an act of accessing one or more postconditions for the first task;

an act of adding the one or more postconditions to the sequence postconditions list;

for one or more subsequent tasks in the sequence of tasks, an act of performing the following, one subsequent task at a time:

an act of accessing one or more preconditions for the subsequent task in the sequence of tasks;

an act of comparing each of the one or more preconditions for the subsequent task with each of the conditions in the sequence preconditions list and the sequence postconditions list and determining whether a conflict exists;

if a conflict is determined to exist between the one or more preconditions for the subsequent task and any of the conditions in the sequence preconditions list and the sequence postconditions list, an act of failing the sequence of tasks such that none of the tasks are executed;

an act of determining whether or not the one or more preconditions for the subsequent task are equivalent to any conditions in the sequence post condition list;

if the one or more preconditions for the subsequent task do not conflict with any of the conditions and are not equivalent to any of the conditions in sequence post condition list, an act of ensuring that the one or more preconditions are represented in the sequence preconditions list by adding the one or more preconditions to the sequence preconditions list unless an identical precondition already exists therein;

an act of accessing one or more postconditions for the subsequent tasks;

for each postcondition of the one or more postconditions for the subsequent tasks, an act of performing the following:

an act of determining if the postcondition conflicts with any of the postconditions in the sequence postconditions list;

if the postcondition does not conflict with any of the postconditions in the sequence postconditions list, an act of ensuring that the postcondition is represented in the sequence postconditions list by adding the postcondition to the sequence postconditions list unless an identical postcondition already exists therein;

if the postcondition conflicts with any of the postconditions in the sequence postconditions list, an act of removing the preexisting conflicting postcondition from the sequence postconditions list.

2. A method in accordance with claim 1, further comprising:

prior to executing any of the tasks in the sequence of tasks, an act of determining whether or not all of the preconditions in the sequence preconditions list are satisfied;

if not all of the preconditions in the sequence preconditions list are satisfied, an act of failing the sequence of tasks without performing any of the sequence of tasks.

3. A method in accordance with claim 2, wherein the act of determining whereon or not all of the preconditions in the sequence preconditions list are satisfied comprises the following for each precondition:

an act of calling a verify method in a condition object corresponding to the precondition; and an act of evaluating a return of the verification method to determine whether the precondition failed or was satisfied.

4. A method in accordance with claim 3, wherein the act of evaluating a return of the verify method comprises the following:

an act of comparing an actual value of a parameter returned by the verification method with an expected value of the parameter.

5. A method in accordance with claim 2, wherein the method is further for executing the sequence of tasks if all of the preconditions in the sequence preconditions list are satisfied, the method further comprising:

an act of executing the first task;

an act of executing the one or more subsequent tasks.

6. A method in accordance with claim 5, wherein the act of executing the first task comprises an act of calling an execution method of a first task object, and wherein the act of executing the one or more subsequent tasks comprising an act of calling an execution method of a subsequent task object corresponding to each of the one or more subsequent tasks.

7. A method in accordance with claim 5, further comprising the following after the act of executing the one or more subsequent tasks:

an act of determining that all of the postconditions in the sequence postconditions list are satisfied to thereby complete execution of the sequence of tasks.

8. A method in accordance with claim 7, wherein the act of determining that all of the postconditions in the sequence postconditions list are satisfied comprises the following for each postcondition:

an act of calling a verify method in a condition object corresponding to the postcondition; and an act of evaluating a return of the verification method.

9. A method in accordance with claim 8, wherein the act of evaluating a return of the verify method comprises the following:

an act of comparing an actual value of a parameter returned by the verification method with an expected value of the parameter.

10. A method in accordance with claim 5, further comprising the following after the act of executing the one or more subsequent tasks:

an act of determining that not all of the postconditions in the sequence postconditions list are satisfied;

an act of compensating for the one or more subsequent tasks by undoing each task in reverse order; and an act of compensating for the first task after compensating for the one or more subsequent tasks.

11. A method in accordance with claim 5, wherein if the execution of any task of the sequence of tasks fails, the following is performed subsequent to the failure:

an act of compensating for the one or more subsequent tasks that have been performed up to the point of the failure by undoing each task in reverse order; and an act of compensating for the first task after compensating for the one or more subsequent tasks that had been performed up to the time the failure occurred.

12. A computer program product for use in a computing system that includes one or more processors, the computer program product comprising one or more storage media having thereon computer-executable instructions that, when executed by the one or more processors, causes the computing system to perform a method, the method for the computing system to prior to execution of a sequence of tasks, a sequence preconditions list and a sequence postconditions list for the entire sequence by combining and consolidating one or more preconditions and one or more postconditions from individual tasks in the sequence of tasks, and, also prior to execution of any task in the sequence of tasks, using the preconditions and postconditions to check for conflicts and thereby verify that the sequence of tasks is more likely not to fail, the method comprising the following:

an act of accessing one or more preconditions for a first task in the sequence of tasks;

an act of adding the one or more preconditions to the sequence preconditions list;

an act of accessing one or more postconditions for the first task;

an act of adding the one or more postconditions to the sequence postconditions list;

for one or more subsequent tasks in the sequence of tasks, an act of performing the following, one subsequent task at a time:

an act of accessing one or more preconditions for the subsequent task in the sequence of tasks;

an act of comparing each of the one or more preconditions for the subsequent task with each of the conditions in the sequence preconditions list and the sequence postconditions list and determining whether a conflict exists;

if a conflict is determined to exist between the one or more preconditions for the subsequent task and any of the conditions in the sequence preconditions list and the sequence postconditions list, an act of failing the sequence of tasks such that none of the tasks are executed;

an act of determining whether or not the one or more preconditions for the subsequent task are equivalent to any conditions in the sequence post condition list;

if the one or more preconditions for the subsequent task do not conflict with any of the conditions and are not equivalent to any of the conditions in sequence post condition list, an act of ensuring that the one or more preconditions are represented in the sequence preconditions list by adding the one or more preconditions to the sequence preconditions list unless an identical precondition already exists therein;

an act of accessing one or more postconditions for the subsequent tasks;

for each postcondition of the one or more postconditions for the subsequent tasks, an act of performing the following:
    an act of determining if the postcondition conflicts with any of the postconditions in the sequence postconditions list;
    if the postcondition does not conflict with any of the postconditions in the sequence postconditions list, an act of ensuring that the postcondition is represented in the sequence postconditions list by adding the postcondition to the sequence postconditions list unless an identical postcondition already exists therein:
    if the postcondition conflicts with any of the postconditions in the sequence postconditions list, an act of removing the preexisting conflicting postcondition from the sequence postconditions list.

13. A computer program product in accordance with claim 12, the method further comprising:
an act of determining whether or not all of the preconditions in the sequence preconditions list are satisfied;
if not all of the preconditions in the sequence preconditions list are satisfied, an act of failing the sequence of tasks without performing any of the sequence of tasks.

14. A computer program product in accordance with claim 13, wherein the act of determining whereon or not all of the preconditions in the sequence preconditions list are satisfied comprises the following for each precondition:
an act of calling a verify method in a condition object corresponding to the precondition; and
an act of evaluating a return of the verification method.

15. A computer program product in accordance with claim 14, wherein the act of evaluating a return of the verify method comprises the following:
an act of comparing an actual value of a parameter returned by the verification method with an expected value of the parameter.

16. A computer program product in accordance with claim 13, wherein the method is further for executing the sequence of tasks if all of the preconditions in the sequence preconditions list are satisfied, the method further comprising:
an act of executing the first task;
an act of executing the one or more subsequent tasks.

17. A computer program product in accordance with claim 16, wherein the act of executing the first task comprises an act of calling an execution method of a first task object, and wherein the act of executing the one or more subsequent tasks comprising an act of calling an execution method of a subsequent task object corresponding to each of the one or more subsequent tasks.

18. A computer program product in accordance with claim 16, the method further comprising the following after the act of executing the one or more subsequent tasks:
an act of determining that all of the postconditions in the sequence postconditions list are satisfied to thereby complete execution of the sequence of tasks.

19. A computer program product in accordance with claim 18, wherein the act of determining that all of the postconditions in the sequence postconditions list are satisfied comprises the following for each postcondition:
an act of calling a verify method in a condition object corresponding to the postcondition; and
an act of evaluating a return of the verification method.

20. A computer program product in accordance with claim 19, wherein the act of evaluating a return of the verify method comprises the following:
an act of comparing an actual value of a parameter returned by the verification method with an expected value of the parameter.

21. A computer program product in accordance with claim 16, the method further comprising the following after the act of executing the one or more subsequent tasks: an act of determining that not all of the postconditions in the sequence postconditions list are satisfied;
an act of compensating for the one or more subsequent tasks by undoing each task in reverse order; and
an act of compensating for the first task after compensating for the one or more subsequent tasks.

22. A method in accordance with claim 16, wherein if the execution of any task of the sequence of tasks fails, the following is performed subsequent to the failure:
an act of compensating for the one or more subsequent tasks that have been performed up to the point of the failure by undoing each task in reverse order; and
an act of compensating for the first task after compensating for the one or more subsequent tasks that had been performed up to the time the failure occurred.

23. In a computing system that includes one or more processors and a computer-readable media having thereon computer-executable instructions, a method for the computing system to verify that a sequence of tasks is more likely not to fail, the method performed by executing the computer-executable instructions by the one or more processors, the method comprising the following:
an act of accessing one or more preconditions for a first task in the sequence of tasks;
an act of adding the one or more preconditions to a sequence preconditions list;
an act of accessing one or more postconditions for the first task;
an act of adding the one or more postconditions to a sequence postconditions list;
for one or more subsequent tasks in the sequence of tasks, an act of performing the following one subsequent task at a time:
    an act of accessing one or more preconditions for the subsequent task in the sequence of tasks;
    an act of determining whether or not any of the one or more preconditions for the subsequent task conflict with any conditions in the sequence preconditions list and the sequence post condition list;
    if the one or more preconditions for the subsequent task conflict with any of the conditions, an act of failing the sequence of tasks;
    an act of determining whether or not the one or more preconditions for the subsequent task are equivalent to any conditions in the sequence post condition list;
    if the one or more preconditions for the subsequent task do not conflict with any of the conditions and are not equivalent to any of the conditions in sequence post condition list, an act of ensuring that the one or more preconditions are represented in the sequence preconditions list;
    an act of accessing one or more postconditions for the subsequent tasks;
for each postcondition of the one or more postconditions for the subsequent tasks, an act of perfonning the following:
    an act of determining if the postcondition conflicts with any of the postconditions in the sequence postconditions list;
    if the postcondition conflicts with any of the postconditions in the sequence postconditions list, an act of removing the conflicting postcondition from the sequence postconditions list; and if the postcondition does not conflict with any of the postconditions in the sequence postconditions list, an act of ensuring that the postcondition is represented in the sequence postconditions list;

an act of determining whether or not all of the preconditions in the sequence preconditions list are satisfied;

if not all of the preconditions in the sequence preconditions list are satisfied, an act of failing the sequence of tasks without performing any of the sequence of tasks;

an act of executing the first task;

an act of executing the one or more subsequent tasks;

an act of determining that not all of the postconditions in the sequence postconditions list are satisfied;

an act of compensating for the one or more subsequent tasks by undoing each task in reverse order; and an act of compensating for the first task after compensating for the one or more subsequent tasks.

24. A computer program product for use in a computing system that includes one or more processors, the computer program product comprising one or more storage media having thereon computer-executable instructions that, when executed by the one or more processors, causes the computing system to perform a method, the method for the computing system to verify that a sequence of tasks is more likely not to fail, the method comprising the following:

an act of accessing one or more preconditions for a first task in the sequence of tasks;

an act of adding the one or more preconditions to a sequence preconditions list;

an act of accessing one or more postconditions for the first task;

an act of adding the one or more postconditions to a sequence postconditions list;

for one or more subsequent tasks in the sequence of tasks, an act of performing the following one subsequent task at a time:

an act of accessing one or more preconditions for the subsequent task in the sequence of tasks;

an act of determining whether or not any of the one or more preconditions for the subsequent task conflict with any conditions in the sequence preconditions list and the sequence post condition list;

if the one or more preconditions for the subsequent task conflict with any of the conditions, an act of failing the sequence of tasks;

an act of determining whether or not the one or more preconditions for the subsequent task are equivalent to any conditions in the sequence post condition list;

if the one or more preconditions for the subsequent task do not conflict with any of the conditions and are not equivalent to any of the conditions in sequence post condition list, an act of ensuring that the one or more preconditions are represented in the sequence preconditions list;

an act of accessing one or more postconditions for the subsequent tasks;

for each postcondition of the one or more postconditions for the subsequent tasks, an act of performing the following:

an act of determining if the postcondition conflicts with any of the postconditions in the sequence postconditions list;

if the postcondition conflicts with any of the postconditions in the sequence postconditions list, an act of removing the conflicting postcondition from the sequence postconditions list; and if the postcondition does not conflict with any of the postconditions in the sequence postconditions list, an act of ensuring that the postcondition is represented in the sequence postconditions list;

an act of determining whether or not all of the preconditions in the sequence preconditions list are satisfied;

if not all of the preconditions in the sequence preconditions list are satisfied, an act of failing the sequence of tasks without performing any of the sequence of tasks;

an act of executing the first task;

an act of executing the one or more subsequent tasks;

an act of determining that not all of the postconditions in the sequence postconditions list are satisfied;

an act of compensating for the one or more subsequent tasks by undoing each task in reverse order; and an act of compensating for the first task after compensating for the one or more subsequent tasks.

* * * * *